United States Patent [19]

Sharbaugh

[11] Patent Number: 4,601,449
[45] Date of Patent: Jul. 22, 1986

[54] ELECTRIC PIPE SNUBBER

[75] Inventor: John E. Sharbaugh, Bullskin, Pa.

[73] Assignee: Westinghouse Electric Corp., Pittsburgh, Pa.

[21] Appl. No.: 543,598

[22] Filed: Oct. 19, 1983

[51] Int. Cl.⁴ .............................................. F16L 3/18
[52] U.S. Cl. ............................ 248/58; 248/DIG. 1; 188/67; 188/171; 188/173
[58] Field of Search ................ 248/58, 55, 64, 49, 248/DIG. 1, 573, 550; 188/67, 171, 173

[56]  References Cited
U.S. PATENT DOCUMENTS

| 2,702,101 | 2/1955 | Dewhurst | 188/171 |
| 4,384,696 | 5/1983 | Blake | 248/49 |
| 4,419,924 | 12/1983 | Peter | 188/67 |
| 4,449,615 | 5/1984 | Beath | 188/67 |
| 4,475,607 | 10/1984 | Haney | 188/67 |

FOREIGN PATENT DOCUMENTS 64016  5/1977  Japan ............................... 248/55

Primary Examiner—Reinaldo P. Machado
Assistant Examiner—Alvin Chin-Shue
Attorney, Agent, or Firm—Daniel C. Abeles

[57] ABSTRACT

An electric pipe snubber has an annular housing, fixed to a supporting surface, surrounding a pipe and a plurality of brake means fixed to the housing radially disposed about the pipe, which are biased towards and engage a serrated section on the pipe, and a means for electromagnetically releasing the brake means to permit axial displacement of the pipe relative to the annular housing. The brake means have teeth on the end thereof which mesh with the serrations on the pipe. A pipe support system using a series of the electric pipe snubbers along a length of pipe has a control means which releases the brakes of one of the series of the snubbers while the remainder of the series restrain the pipe from axial displacement.

14 Claims, 6 Drawing Figures

ELECTRIC PIPE SNUBBER

BACKGROUND OF THE INVENTION

There are many pipe systems which must be supported in such a manner that the pipes are free to move during normal thermal expansion, but must be restrained from motion during seismic events. Thus, the pipes must be permitted to expand or contract during temperature changes but must be restrained from rapid motion.

In nuclear power generating facilities, for example, numerous pipes carrying various pressurized or high temperature fluids must be supported from the walls or other structure of a building. During normal operation, these pipes must be so supported that they are rigidly secured while still being permitted to expand or contract due to thermal stresses. Also, on shut-down or start-up of such a facility, the pipes will contract or expand to such an extent that they cannot be fixed directly to a supporting structure without provision for thermal effects. While some provision is therefore necessary to permit limited movement of the pipes during thermal changes, which are slow movements, the pipes must be secured rigidly during any possible seismic event so as to prevent rupture of the pipes with the resultant serious consequences. It is thus required that snubbing devices be used in connection with such pipes to enable slow movement, while rigidly securing such pipes during any period of rapid movements.

Such snubbing devices are generally either hydraulic devices or mechanical devices. The hydraulic type of snubbing devices require the use of a hydraulic fluid and various seals which have been found to slowly deteriorate in time, especially when subjected to an environment containing radiation. These hydraulic snubbers thus have high maintenance requirements and servicing is a problem. The use of such hydraulic snubbing devices has therefore given way to various mechanical snubbing devices. Examples of such mechanical snubbing devices are given in U.S. Pat. No. Re 29,221; U.S. Pat. No. 4,054,186; U.S. Pat. No. 4,177,882; and U.S. Pat. No. 4,187,933, which discuss the problems associated with previous hydraulic snubbing devices and which disclose various mechanical means for allowing slow movement of a restrained pipe while preventing rapid movement of the pipes during a seismic event.

The mechanical snubbing devices, while eliminating problems associated with hydraulic devices, pose other problems. For example, because of the mechanical nature of such devices, they are subject to wear and deterioration, and they may also lock up and fail to move so that they must be serviced or replaced. Furthermore, in nuclear power generating facilities, a requirement exists that snubbing devices be periodically operated in order to assure that all snubbers are operating as intended. This requires that each mechanical snubbing device be removed from the installed location and tested through its full operating stroke. Such a procedure is necessarily time consuming and expensive.

An object of the present invention is to provide a snubbing device, that is operable by electronic pulses, which overcomes problems associated with hydraulic and mechanical snubbers.

Another object of the present invention is to provide a snubbing device that is readily tested so as to determine its operability without dismantling or removing the snubber from its location.

SUMMARY OF THE INVENTION

An electric pipe snubber, which is actuated to permit slow movements of a pipe due to thermal stresses but normally restrains the pipe from axial motion has a fixed annular housing that surrounds a serrated section on the pipe, a plurality of brake means on the housing that radially engage the serrations on the pipe and an electromagnet for intermittently releasing the brake means from engagement with the serrations to permit intermittent axial displacement of the pipe relative to the fixed annular housing.

The annular housing is preferably formed of two mating semicircular portions and the brake means, depending inwardly from the housing towards the serrated section of pipe, are equidistantly spaced about the pipe. Embodiments of the brake means comprise a reciprocable block having engaging teeth on the outer end, the block slidably contained with an outer casing, or a pair of arms pivotally attached at one end, with one of the arms having a shoulder having engaging teeth thereon at the other end. The brake means release the pipe upon activation of the electromagnet to permit axial displacement of the pipe, while normally restraining such displacement. By use of a series of the electric snubbers along a length of the pipe, the snubbers may be controlled to energize in sequence so that while the brake means of one snubber is released from a section of the pipe, the brake means of adjacent snubbers restrain movement of their sections of the pipe.

BRIEF DESCRIPTION OF THE DRAWINGS

For a fuller understanding of the present invention reference is made to the accompanying drawings, wherein.

DETAILED DESCRIPTION

The present invention provides an electric snubbing device, especially useful in supporting piping such as that used in nuclear power generating facilities, which normally restrains the pipe from movement but, with application of a short electrical pulse, allows the pipe to move sufficiently to release thermal expansion or contraction stresses which may develop during the restraining of the pipe.

Figure 1:
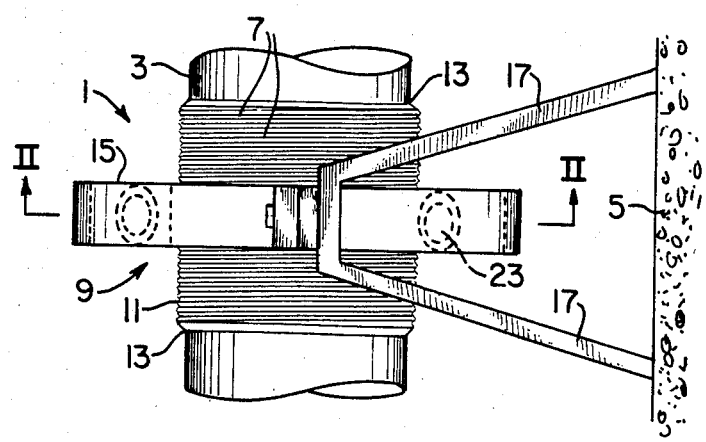
FIG. 1 is a plan view of the electric snubbing device of the present invention supporting a pipe from a wall structure.
Figure 2:
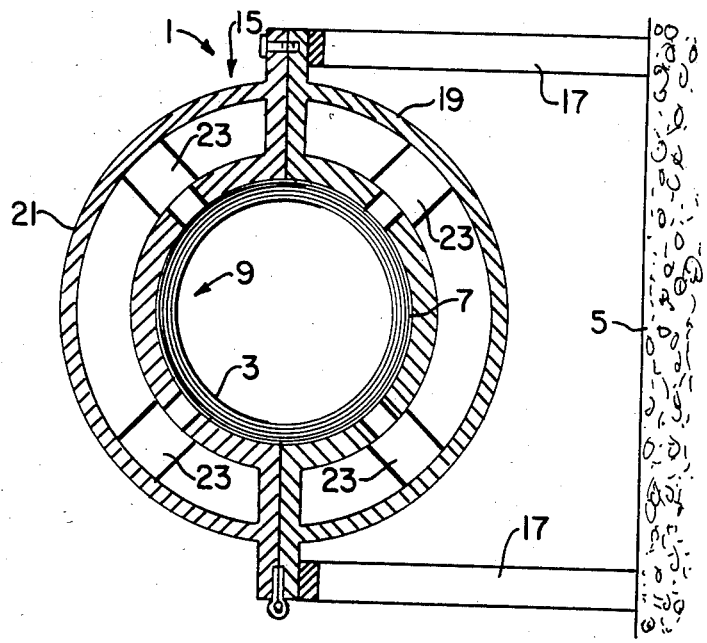
FIG. 2 is a cross-sectional view taken along line II—II of FIG. 1.

In FIG. 1, there is illustrated an electrical snubbing device 1, of the present invention, the snubbing device shown supporting a pipe 3 from a wall 5. The electric snubbing device includes a plurality of serrations 7 about a section 9 of the pipe 3, the serrations 7 being spaced from each other axially along the pipe 3. The serrations 7 may be formed directly on the pipe 3 but preferably are formed on a collar 11 which fits about the pipe 3 and is welded, such as by welds 13, or otherwise securely fixed to the pipe 3. The serrations extend over a section 9 of the pipe 3 a distance that will effectively provide a series of such serrations on both sides of an annular housing 15, through the full length of possible expansion or contraction of the pipe 3 relative to the annular housing 15. The annular housing 15 is radially spaced from and disposed about the section 9 of the pipe 3 and is rigidly fixed to the wall 5, or other supporting structure, by use of anchors 17, on each side of the pipe 3, which are rigidly secured to the wall 5. As illustrated, the annular housing may be formed as two semicircular portions 19 and 21 which are clamped together and securely fastened to form a spaced ring about the pipe section 9. The semicircular portions may also be pivotally attached at one end to provide placement over the pipe, with the other end then securely fastened together, in the nature of a clam shell arrangement.

Fixed to the annular housing 15, and radially disposed about the section 9 of the pipe 3 are a plurality of brake means 23. The brake means 23 are equidistantly spaced about the annular housing 15 and extend radially inwardly from the housing towards the section 9 of pipe 3. While four such brake means are illustrated in FIG. 1, three such equidistantly spaced brake means could be sufficient, or more than four such brake means may be used, depending upon the particular application.

Figure 3:
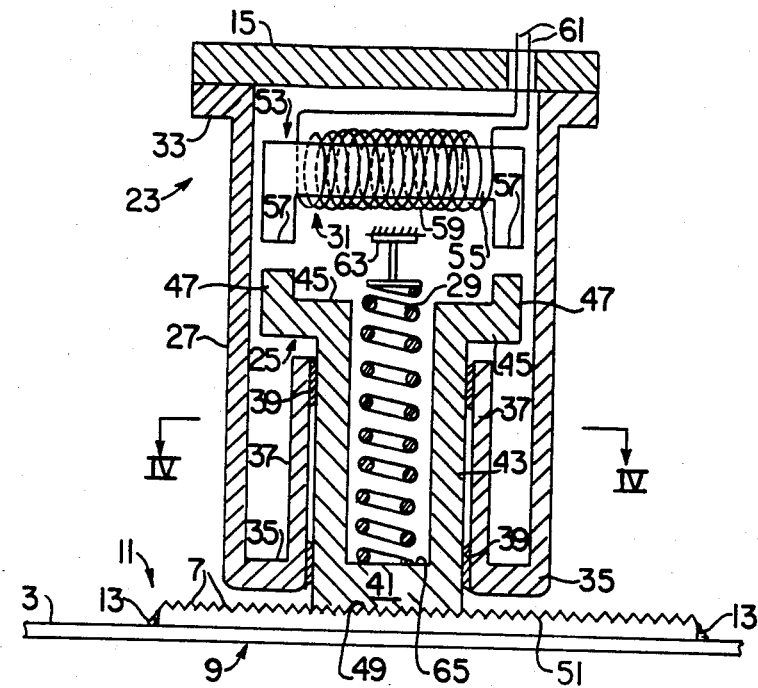
FIG. 3 is a cross-sectional view of an embodiment of the brake means usable in the snubber of the present invention.
Figure 4:
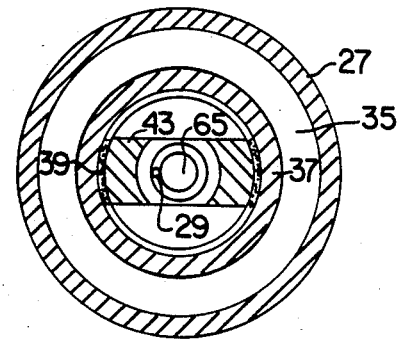
FIG. 4 is a view taken along the line IV—IV of FIG. 3.

In the embodiment illustrated in FIGS. 3 and 4, the brake means 23 comprises a hollow reciprocable member 25 which is reciprocable in an outer cylindrical casing 27, with reciprocable motion effected by a compression spring 29 and an electromagnetic means 31. The outer casing 27 has outwardly extending flanges 33 that are secured to the interior surface of the annular housing 15, by welding or other securement. The cylindrical casing 27 extends radially inward from the annular housing 15 and has an inwardly directed rim 35, spaced from the section 9 of pipe 3, the rim having at the terminus thereof a radially outward directed flange 37 which forms a cup-shaped guide member for the reciprocable member 25. Bushings 39, on the radially outwardly directed flange 37 provide for a sliding fit between the hollow reciprocable member 25 and outer casing 27. The hollow reciprocable member 25 has a base 41, walls 43, and an outwardly extending skirt 45 which has a lip 47 extending therefrom. The outer surface 49 of the base 41 has teeth 51 thereon which, as hereinafter described, mate with the serrations 7 on section 9 of pipe 3. Within the outer cylindrical casing 27, in the region of the annular housing 15 and spaced from the reciprocable member 25, is an electromagnet 53, illustrated as a bar 55 having depending legs 57, which confront the lips 47 of the hollow reciprocable member 25, the bar 55 having conductive wire 59 thereabout. Leads 61, of the wire 59, pass through the annular housing 15, the leads 61 being connected to circuitry (not shown) for activating the electromagnet 53. A fixed stop member 63, within the outer cylindrical casing 27, is positioned such that the compression spring 29 is held in the hollow reciprocable member 25 between the stop member 63 and the inner surface 65 of the base 41 thereof, so as to bias the hollow reciprocable member 25 towards the pipe 3. With this biasing force, the teeth 51 on the outer surface 49 of the base 41 are biased into contact, and mesh with, the serrations 7 on the section 9 of pipe 3.

In the present invention, the brake means 23 is, at rest position, in engagement with the section 9 of the pipe 3 and prevents axial movement of the pipe 3 relative to the annular housing 15. With the teeth 51 on the base 41 of the reciprocable member 25 meshed with the serrations 7 on the section 9 of the pipe 3, restraint of the pipe 3 is assured. The pipe 3, as previously discussed, will build up thermal stresses which must be periodically relieved. Such relief is provided by intermittently energizing the electromagnet 53 which will cause reciprocation of the hollow reciprocable member 25 towards the electromagnet 53 within the outer casing 27 and will release the teeth 51 from contact with the serrations 7. This intermittent releasing will permit the pipe 3 to move axially and relax the stresses. The voltage to energize the electromagnet 53 is applied only for a short period of time, for example, a second or less, and, upon cessation of the voltage, the compression spring 29, in the hollow reciprocable member 25 will again bias the reciprocable member towards the pipe 3 such that teeth 51 again mesh with the serrations 7 on section 9 of the pipe 3 and restrain further axial movement of the pipe 3 relative to the fixed housing 15. Thus, the axial movement of the pipe 3 is limited to that which will relieve the expansion or contraction stresses built up during the non-energized period of the electromagnetic means 31. While the teeth prevent axial movement of the pipe section, provision may be made, by shaping of the teeth and serrations, to enable a slight degree of deflection of the pipe when the teeth are meshed with the serrations to relieve some stress on the pipe.

Figure 6:
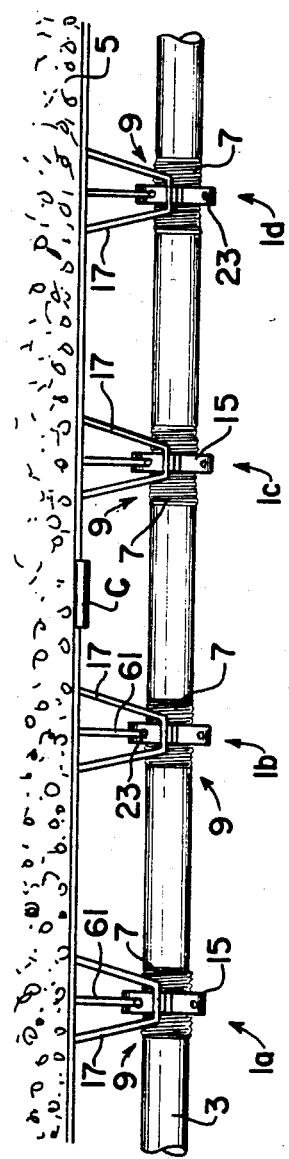
FIG. 6 schematically illustrates a pipe supporting system using a series of the electric snubbers of the present invention.

The electrical circuitry for the operation of an electric snubber of the present invention can be solid state and made highly reliable. Also, one control unit could be used to operate a plurality of such electric snubbers, spaced along a length of pipe, in a sequence which assures that only one snubbing device is released at any one time period. By sequencing the electric snubbers in this manner, for example, activating any particular electric snubber at one minute intervals, or other timed sequence, any seismic load occurring during a release phase of one electric snubber would be restrained by adjacent de-energized electric snubbers. Also, thermal restraint loads in the piping would be minimized by sequential release of a series of such electric snubbers. As illustrated schematically in FIG. 6, a series of electric snubbers 1a–1d are fixed to a wall 5 by means of anchors 17 and support a length of pipe 3. A common control unit c is provided for the series of electric snubbers and the activation of the snubbers can be sequenced. Thus, during a period of time when the electromagnets of electric snubber 1b are activated, so as to release the brake means 23 from restraining the pipe 3 at the location of electric snubber 1b, the remaining electric snubbers of the series, 1a, 1c and 1d would still restrain the movement of the pipe 3 from axial movement relative thereto.

Figure 5:
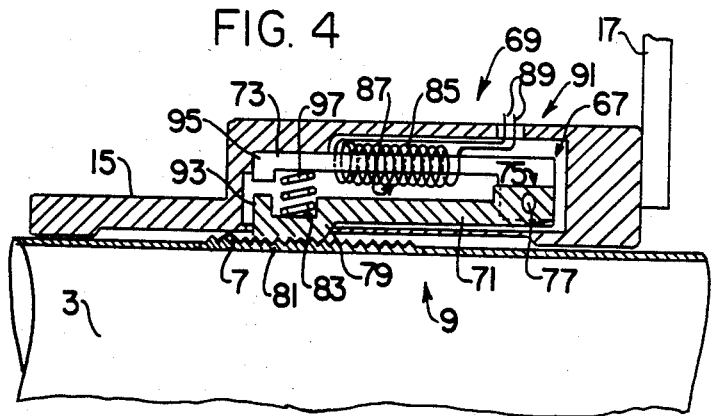
FIG. 5 is a cross-sectional view of another embodiment of the brake means usable in the snubber of the present invention.

Another embodiment of a brake means is illustrated in FIG. 5, wherein the annular housing 15 has a recess 67 formed therein, the annular housing fixed to a support member by anchors 17. The annular housing 15 is radially spaced from and disposed about a section 9 of a pipe 3, the section 9 having serrations 7. While only a portion of the annular housing is shown in FIG. 5, the fixed annular housing 15 will extend around the pipe 3 and will have a plurality of recesses 67 and brake means 69 therein. The brake means 69 comprises a pair of arms 71 and 73 pivotally attached together at one end, as at 75, by a pivot 77 fixed to the housing 15. The first arm 71 has a shoulder 79 at the end opposite pivot point 75, the shoulder 79 having teeth 81 thereon. A groove 83 is formed in the first arm 71 at the shoulder 79. The second arm 73 is locked into position in the recess 67 and has a conductive coil 85 thereabout to serve as an electromagnet 87, the coil having leads 89 which pass through the housing, through an orifice 91, and are connected to a source of electric current (not shown). The end of first arm 71 has a lip 93, and the end of second arm 73 has a confronting lip 95, as illustrated, with the arms biased away from each other by a compression spring 97, positioned in groove 83. The compression spring 97 biases first arm 71 towards pipe 3, and the teeth 81 on shoulder 79 into meshing relationship with the serrations 7 on section 9 of the pipe. Upon energizing the electromagnet 87, as previously described, the first arm 71 will pivot towards secton arm 73 and will release the engagement of teeth 81 with serrations 7 and permit axial displacement of the pipe 3 relative to the fixed annular housing 15.

While the embodiments of the preferred brake means illustrated use a compression spring to bias the teeth of a portion of the brake means into contact with the serrations on the pipe, other such biasing means, such as a cam, or the like, could be used, using an electromagnetic means to release the same.

Because of the simplicity of the operative parts of the electrical snubber of the present invention, the same can be manufactured at a competitive cost with commercially available hydraulic or mechanical snubbers. Since the release voltage is applied to the electric snubber only for a short time period, and only intermittently over an extended time period, operating costs will also be low. It is also feasible that control of the electric pulse sequence on a series of snubbers could be adjusted by thermal feedback circuits which would delay the pulse rate during steady state conditions and increase the pulse rate during periods of thermal stress. Also, it is possible to provide for an electrical sensing of a seismic event and provide for locking of all of the brakes of the electric snubbers, if desired.

The electric snubbers of the present invention may be remotely and rapidly tested without removing the snubber from the pipe by merely confirming that the brake means release when voltage is applied to the electromagnetic means. This is especially advantageous when the snubbers are used in an environment, such as a radiation-containing environment or in a vacuum system.

What is claimed is:

1. An electric pipe snubber comprising:
   a plurality of axially spaced serrations about the outer surface of a section of a pipe;
   an annular housing fixed to a supporting structure, said annular housing being radially spaced from and disposed about said section of pipe;
   a plurality of brake means carried by said annular housing, said brake means normally biased for reciprocating engagement with said serrations to prevent axial displacement of said section of pipe relative to said fixed annular housing; and
   electromagnetic means for intermittently releasing said brake means from engagement with said serrations to permit axial displacement of said section of pipe relative to said fixed annular housing.

2. An electric pipe snubber as defined in claim 1 wherein said annular housing is formed of two semicircular portions mated together to enclose said pipe.

3. An electric pipe snubber as defined in claim 2 wherein said semicircular portions are pivotally attached at one end and secured at the other end.

4. An electric pipe snubber as defined in claim 1 wherein four said brake means are provided, equidistantly spaced about said annular housing.

5. An electric pipe snubber as defined in claim 1 wherein three said brake means are provided, equidistantly spaced about said annular housing.

6. An electric pipe snubber as defined in claim 1 wherein said serrations are on a collar fitted about and secured to said section of pipe.

7. An electric pipe snubber as defined in claim 1 wherein each said brake means comprises a hollow reciprocable member having teeth, on the end thereof adjacent said pipe, which teeth mate with the serrations on the outer surface of said pipe, and a compression spring situated within the hollow reciprocable member normally biases the reciprocable member into engagement with said section of pipe.

8. An electric pipe snubber as defined in claim 7 wherein said hollow reciprocable member is slidably retained in a cup-shaped outer casing attached to said fixed annular housing and said electromagnetic means comprises an electromagnet positioned within said cup-shaped outer casing adjacent to, and spaced from, the end of said reciprocable member opposite the end having said teeth.

9. An electric pipe snubber as defined in claim 1 wherein each said brake means comprises a pair of arms pivotally attached at one end, contained with a recess in said fixed annular housing, a first of said pair of arms having a shoulder on the other end, the shoulder having teeth thereon which mate with the serrations on the outer surface of the pipe, and the second of said pair of arms fixed to said housing and having a conductive coil thereabout to serve as an electromagnet, to pivot said first arm towards said second arm upon activation of said electromagnet.

10. A pipe supporting system comprising:
    a series of electric pipe snubbers fixed to a supporting structure and spaced along a length of the pipe, wherein each of said electric pipe snubbers comprises:
    a plurality of axially spaced serrations about the outer surface of a section of a pipe;
    an annular housing fixed to the supporting structure, said annular housing being radially spaced from and disposed about said section of pipe;
    a plurality of brake means carried by said annular housing, said brake means normally biased for reciprocating engagement with said serrations to prevent axial displacement of said section of pipe relative to said fixed annular housing; and
    electromagnetic means for intermittently releasing said brake means for engagement with said serrations to permit axial displacement of said section of pipe relative to said fixed annular housing; and
    a means for controlling the activation of each of said electromagnetic means.

11. A pipe supporting system as defined in claim 10 wherein said means for controlling the activation of each of said electromagnetic means releases the brake means of one of said series of electric pipe snubbers at a time when the brake means of others of said series of electric pipe snubbers remain biased into engagement with said serrations.

12. A pipe supporting system as defined in claim 11 wherein each of said electric pipe snubbers of said series is sequentially activated.

13. A pipe supporting system as defined in claim 12 wherein said means for controlling sequentially activates each of said electric pipe snubbers in the axial direction of said pipe.

14. A pipe supporting system as defined in claim 12 wherein said means for controlling increases the rate of said sequential activation during periods of increased thermal stress on said pipe.

* * * * *